United States Patent
Tax et al.

(10) Patent No.: US 10,961,134 B2
(45) Date of Patent: Mar. 30, 2021

(54) METHOD OF REMOVING PESTICIDES FROM WASTEWATER

(71) Applicant: INNOVATIVE WATER CARE, LLC, Alpharetta, GA (US)

(72) Inventors: Maurice Paul Tax, Joure (NL); Jerome Logie, Sainte Euphemie (FR)

(73) Assignee: INNOVATIVE WATER CARE, LLC, Alpharetta, GA (US)

( * ) Notice: Subject to any disclaimer, the term of this patent is extended or adjusted under 35 U.S.C. 154(b) by 69 days.

(21) Appl. No.: 16/354,489

(22) Filed: Mar. 15, 2019

(65) Prior Publication Data

US 2019/0292075 A1 Sep. 26, 2019

Related U.S. Application Data

(60) Provisional application No. 62/645,984, filed on Mar. 21, 2018.

(51) Int. Cl.

| C02F 1/46 | (2006.01) |
|---|---|
| C02F 1/461 | (2006.01) |
| C02F 1/44 | (2006.01) |
| C02F 1/72 | (2006.01) |
| C02F 1/467 | (2006.01) |

(Continued)

(52) U.S. Cl.
CPC ............ C02F 1/461 (2013.01); C02F 1/444 (2013.01); C02F 1/4672 (2013.01); C02F 1/722 (2013.01); C02F 1/283 (2013.01); C02F 1/442 (2013.01); C02F 2001/46142 (2013.01); C02F 2101/305 (2013.01); C02F 2101/306 (2013.01); C02F 2103/26 (2013.01); C02F 2201/46135 (2013.01); C02F 2201/46185 (2013.01); C02F 2209/04 (2013.01); C02F 2209/06 (2013.01); C02F 2209/29 (2013.01)

(58) Field of Classification Search
CPC .... C02F 1/461; C02F 1/44; C02F 1/72; C02F 9/00; C02F 1/78; C02F 1/66; C02F 1/32; B01D 61/04; C01F 1/72; C01F 1/76; C01F 1/46; C01F 1/52; C01F 9/00
See application file for complete search history.

(56) References Cited

U.S. PATENT DOCUMENTS

| 5,245,111 A | * | 9/1993 | Betz | .................. C02F 1/467 204/252 |
|---|---|---|---|---|
| 6,375,827 B1 | * | 4/2002 | Kurosu | ............... A61L 2/035 204/263 |

(Continued)

FOREIGN PATENT DOCUMENTS

| CN | 110112387 A | * | 8/2019 |
|---|---|---|---|
| WO | 2006/061192 A1 | | 6/2006 |
| WO | 2017/136647 A1 | | 8/2017 |

OTHER PUBLICATIONS

Cn-110112387-A, Aug. 2019; CN Wang. English translation (Year: 2019).*

(Continued)

*Primary Examiner* — Cameron J Allen
(74) *Attorney, Agent, or Firm* — Brown Rudnick LLP

(57) ABSTRACT

The present disclosure is directed to a method of removing pesticides from water. An electrolysis cell oxidizes pesticides and/or other organic components, optionally in conjunction with one or more filtration steps. Hydrogen peroxide may be added to the electrolysis process to aid oxidation.

16 Claims, 2 Drawing Sheets

(51) Int. Cl.
  *C02F 101/30* (2006.01)
  *C02F 1/28* (2006.01)
  *C02F 103/26* (2006.01)

(56) References Cited

U.S. PATENT DOCUMENTS

| 10,046,989 B2* | 8/2018 | Wylie ............... C25B 11/12 |
| 2009/0152123 A1* | 6/2009 | Butler ............... C02F 1/4672 |
| | | 205/455 |
| 2011/0024361 A1 | 2/2011 | Schwartzel et al. |

OTHER PUBLICATIONS

International Search Report and Written Opinion in PCT/US2019/022429, dated May 6, 2019, (10 pages).
C. Barrera-Diaz, et al. Electrochemical Advanced Oxidation Processes: An Overview of the Current Applications to Actual Industrial Effluents, J. Mex. Chem. Soc. 2014, 58(3), 256-275, Sociedad Quimica de Mexico.
Guohua Chen, Electrochemical technologies in wastewater treatment, Science Direct, Separation and Purification Technology 38 (2004) 11-41.
Jelena Radjenovic et al., Challenges and Opportunities for Electrochemical Processes as Next-Generation Technologies for the Treatment of Contaminated Water, Environmental Science and Technology, 2015, American Chemical Society, 11292-41302.
Brian P. Chaplin, Critical review of electrochemical advanced oxidation processes for water treatment applications, Environmental Science Processes and Impacts, 2014, 16., 1182-1203.

\* cited by examiner

METHOD OF REMOVING PESTICIDES FROM WASTEWATER

RELATED APPLICATIONS

The present application is based on and claims priority to U.S. Provisional Patent application Ser. No. 62/645,984, filed on Mar. 21, 2018 which is incorporated herein by reference.

BACKGROUND

Pollutants may spread through both natural and manmade water systems. While large detritus may be relatively easy to filter, removing pollutants on the microscale and nanoscale presents a difficult challenge. In particular, even after the successful removal of waste solids, in some applications, pesticide concentrations remain high.

For example, greenhouses, flower bulb farming, and other agricultural industries may produce wastewater with high concentrations of pesticides. High concentrations of pesticides distinguish such agricultural wastewater from other sources, such as domestic wastewater, which may contain hormones or antibiotics.

In a particular example, wastewater from bulb farming contains large amounts of pesticides in high concentration in the Netherlands, where bulb farming is a large industry, the Statistics Netherlands (CBS) reports that approximately 45 kg of pesticides are used per hectare of bulb farm, whereas arable crop farms only apply approximately 5 kg of pesticides per hectare. On these bulb farms, high amounts of pesticides may be transported by water (e.g. rain or artificial irrigation) away from the farms into other environments through drainage conduits.

In view of the above, a need exists for a targeted treatment method which effectively removes pesticides from wastewater with reduced cost and effort.

SUMMARY

In general, the present disclosure is directed to a process for removing pesticides from wastewater. The process includes feeding a wastewater stream (A) to an electrolysis cell, oxidizing the wastewater stream (A), recirculating the effluent of the electrolysis cell through the electrolysis cell, and passing the treated effluent of the electrolysis cell into a product stream. The wastewater stream (A) may originally include a contaminant such as humic acid, a hormone, and/or a pesticide. The product stream, in some embodiments, may be free of more than about 95% of the contaminant.

As described above, in one embodiment, the wastewater source can be fed directly to an electrolysis cell in accordance with the present disclosure. In an alternative embodiment, however, the wastewater may undergo one or more filtration steps. In one embodiment, for instance, the wastewater may be filtered only for large suspended particles. In other embodiments, however, the wastewater may be filtered for smaller particles. In still another embodiment, the wastewater may be fed through an electrolytic cell and then fed through a filter. For instance, after passing through the electrolytic cell, the wastewater stream may be fed to an activated carbon filter for further filtering pesticide residue from the wastewater.

For example, in one embodiment, the process also include the steps of feeding a wastewater stream (B) to a preliminary filtration stage and feeding the permeate of the preliminary filtration stage to a primary filtration stage. The preliminary filtration stage may have greater porosity than the primary filtration stage. The retentate of the primary filtration stage may form the wastewater stream (A), and the permeate of the primary filtration stage may be added to the treated effluent of the electrolysis cell into the product stream.

In some embodiments, the primary filtration stage is a nanofiltration stage.

In some embodiments, the process further includes the step of feeding the permeate of the primary filtration stage to a polishing filtration stage such as an activated carbon filtration stage. In some embodiments, the permeate of at least one polishing filtration stage has a lower sodium concentration than the retentate of the at least one polishing filtration stage.

In some embodiments, the permeate of at least one filtration stage is free of at least about 95% of the original pesticide content of the influent wastewater.

In some embodiments, the electrolysis cell electrodes comprise an oxide or suboxide of $TiO_x$. In some embodiments, the oxide or suboxide of $TiO_x$ is a Magneli phase material of the formula $(Ti_nO_{2n-1})$, where n is 4, 5, 6, 7, 8, 9, or 10. For example, the suboxide may be $Ti_4O_7$.

In some embodiments, flow of the permeate of the primary ration stage is greater than about 0.001 m$^3$/hr, such as greater than about 1 m$^3$/hr.

In some embodiments, the process further includes the step of monitoring a parameter of the flow through the electrolysis cell. The electrolysis cell may be in communication with a power supply, and voltage supplied to the electrolysis cell by the power supply may be increased or decreased based on the monitored parameter.

In some embodiments, the process further includes the step of monitoring the oxidation-reduction potential, pH, free chlorine content, pesticide content, and/or even the hydroxyl radical content in the product stream. At least one parameter within the process may be changed if a monitored concentration is above a preset limit. The parameter being changed may include the flow rate of the wastewater stream and/or the amount of voltage supplied to the electrolysis cell.

In addition to reducing humic acid, a hormone, and/or a pesticide concentration within a wastewater stream, the process of the present disclosure can also be used to lower COD, BOD, and ammonia levels in treated wastewater. For example, in one embodiment, the process can also include converting chloride ions into an oxidizing agent within the electrolysis cell such that the oxidizing agent is present in the wastewater stream at a concentration sufficient to reduce the COD concentration, the BOD concentration, and/or the ammonia concentration in forming aqueous product stream. In one embodiment, the chloride ions may be initially present in the wastewater. Alternatively, chloride can be fed to the wastewater in order to increase the chloride concentration. The chloride can be fed to the wastewater by, for instance, adding brine and/or dissolving a chloride salt within the waste water.

In some embodiments, the process further includes the step of adding a peroxide to the wastewater stream (B) and/or the effluent of the electrolytic cell recirculated to the electrolytic cell.

The present disclosure is also generally directed to a system configured to execute the process disclosed herein.

DEFINITIONS

The term "wastewater" may be understood as any water containing undesired contaminants. For example, wastewater may include industrial byproducts, agricultural chemicals, sewage, or combinations thereof. Particular examples of wastewater sources can include wastewater produced by floriculture businesses or flower farms. For instance, wastewater includes water produced by flower bulb farms. Other wastewater sources can include ballast water, cooling water and the like. The wastewater may flow from a continuous source, be provided in batches (e.g. in collection tanks), in an intermittent pattern, or combination thereof. Wastewater may be associated with a designated effluent of a process (e.g. a liquid effluent of an industrial manufacturing process, or sewage) or may be associated with any water from a known or unknown source with known or unknown contaminants (e.g. water from stream or river).

The term "contaminants" may be understood as any particulate, liquid, chemical substance, biological material, or any other such substance whose presence in a water stream is undesired. Example contaminants may be pesticides, pharmaceuticals, hormones (natural or synthetic, plant or mammalian), human and/or animal waste, microorganisms, micro-pollutants, macro-pollutants, oils, emulsions, lubricants, slime, silts, dyes, metals, plant materials, or other pollutants.

Chemical oxygen demand (COD), biochemical oxygen demand (BOD), and ammonia concentrations are accepted as known metrics by which water quality is characterized. For example, COD may be measured according to ISO 6060:1989 (where 30 mg/L≤COD≤700 mg/L of oxygen), and BOD may be measured according to ISO 5815-1 (where 3 mg/L≤BOD≤6 g/L of oxygen) or ISO 5815-2 (where 0.5 mg/L≤BOD≤6 mg/L of oxygen). As BOD is a subset of COD, COD is always equal to or greater than BOO. Ammonia concentration refers generally to the presence of ammonia, covering both ammonia, $NH_3$, and ammonia ions, e.g. ammonium, $NH_4^+$.

In general, however, initial COD, BOD, or ammonia levels need not meet a particular threshold in order to be affected by the treatment process of the present disclosure. As BOD and ammonia occur even in natural water sources, due to the presence of microorganisms and otherwise, it is to be understood that the adoption of COD, BOD, and ammonia as performance measurement criteria need not limit the broad application of the teachings herein.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
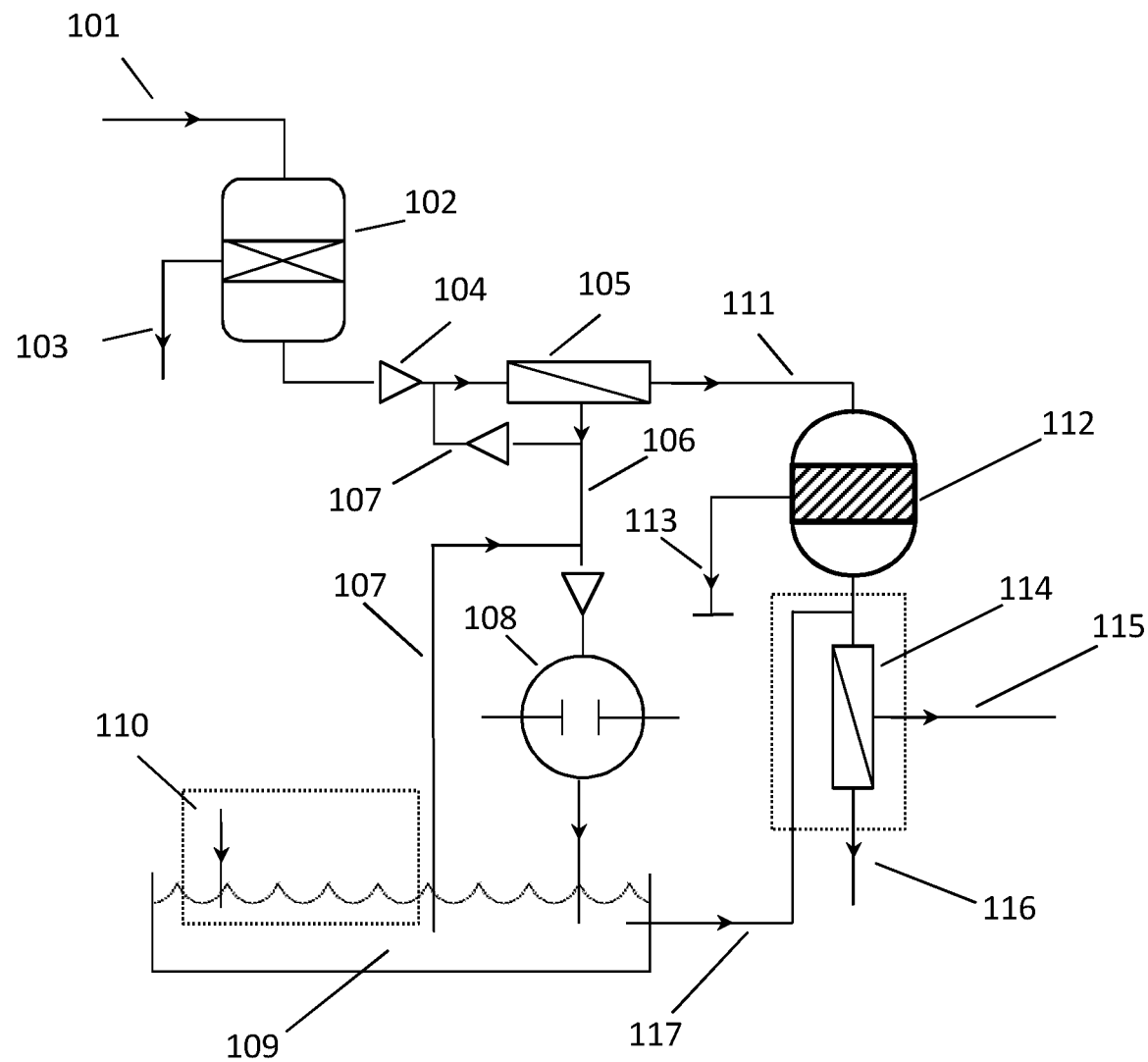
FIG. 1 illustrates one embodiment of a process in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a process for removing pesticides from wastewater with low cost and effort, particularly by passing wastewater through an electrolytic cell.

Wastewater treatment via electrolysis presents many advantages over many passive filtration methods. For example, filtration methods retain a slurry or sludge of particulates and other contaminants, such as dirt, oils, and organic matter. Clearing and cleaning the filters is time consuming and costly.

Of particular advantage, electrolytic oxidation can degrade many compounds into $CO_2$ and $H_2O$, including organic compounds and even traditionally resilient compounds such as aromatic, chlorinated, and phenolic compounds. No sludge is generated, eliminating the costly upkeep and time-consuming maintenance of filtration methods. The electrolysis cell of the present disclosure is also capable of converting chloride ions into an oxidizing agent, such as hypochlorous acid and/or hydroxyl radicals, that can then lower COD, BOD, and/or ammonia concentrations within the wastewater.

In general, electrolysis methods may be more efficient when operating on influent with a high concentration of contaminants. In one embodiment, the influent wastewater is already high in contaminant concentration, e.g. from a bulb farm. In some embodiments, however, filtration methods and electrolysis methods may be combined for synergistic operation, wherein one or more filtration stages increase the concentration of the wastewater sent to the electrolysis cell and the electrolysis cell attacks and oxidatively reduces the traditional sludge or retentate generated by one or more filtration stages.

Thus, in one embodiment, wastewater can be fed directly to the electrolysis cell in accordance with the present disclosure. For example, in one embodiment, the wastewater can be fed directly to electrolysis cell and then filtered using an activated carbon filter. In this embodiment, the filter can be used to remove any residual pesticide.

Alternatively, the wastewater can be first filtered prior to being fed to the electrolysis cell. When filtered, the wastewater may be subjected to a single filtering step or to a plurality of filtering steps. In one embodiment, for instance, only large particulates may be filtered from the waste water. In an alternative embodiment, both large and small particulates or contaminants may be filtered from the wastewater in a single step. In an alternative embodiment, however, the wastewater can be fed to a first filtering step for removing large particulate matter and then fed to a second filtering process for removing smaller contaminants.

In one embodiment, for instance, large solids and particulates may optionally be filtered out in a preliminary filtration stage including one or more filters. A preliminary filtration stage may include a filter selected from any known filtration method in the art. For example, a coarse screen may catch and/or divert large insoluble solids. In another example, the preliminary filtration stage may include a fiber mesh filter. As would be expected, the porosity of the preliminary filtration stage is dependent upon the filtration needs. For example, when very large solids have been removed already, the preliminary filtration stage may include a glass filter having a pore size of less than about 300 µm, such as less than about 200 µm, such as less than about 100 µm. Generally, however, the preliminary filtration stage will include filters having a pore size greater than about 10 µm, such as greater than about 50 µm, such as greater than about 75 µm.

Fine particulates and/or other contaminants may optionally be filtered out of the wastewater in a primary filtration stage including one or more filters. As would be expected, the porosity of filters in the second filtration stage is dependent on the filtration needs and on the configuration of the preliminary filtration stage. For example, the primary filtration stage may include microfiltration, ultrafiltration, or nanofiltration devices. In some embodiments, the primary filtration stage may include filters having a pore size less than about 10 µm, such as less than about 1 µm. Furthermore, the filters may have a pore size less than about 700 nm, such as less than about 400 nm, such as less than about 100 nm, such as less than about 50 nm, such as less than about 20 nm, such as less than about 5 nm. Generally, however, the pore size is greater than about 0.25 nm, such as greater than about 1 nm, such as greater than about 5 nm, such as greater than about 50 nm, such as greater than about 200 nm.

Wastewater having passed through at least one preliminary or primary filtration stage may optionally pass through one or more final polishing filtration stages. For example, a polishing stage may include a second microfiltration, ultrafiltration, or nanofiltration device, or the polishing stage may include another type of filtration device, such as a carbon filtration device (e.g. activated carbon filtration device). In any case, the primary and polishing stages may be the same or different, with filtration devices and filtration mediums selected and specified independently. In some embodiments, the polishing stage includes more than one filter, such as a carbon filtration device and a microfiltration, ultrafiltration, or nanofiltration device.

Any of the filtration stages may be configured in a dead-end alignment (i.e. in series with flow) or in crossflow. Filters configured in crossflow (i.e. tangential flow) pass both a permeate stream (i.e. the flow that permeates the filter element(s)) and a retentate stream (i.e. the flow that retains the particulates/contaminants). By nature of the operation, the retentate contains contaminants in a more concentrated amount than the filter influent. Filtration devices may optionally be reusable or may include replaceable cartridges which become spent as they fill with retentate.

The pressure gradient across the filter element or elements directly influences the effectiveness of the filtration device, especially in the case of a crossflow configuration. For example, the pressure gradient may be greater than about 0.5 bar, such as greater than about 1 bar, such as greater than about 3 bar, such as greater than about 5 bar. Generally, however, the pressure gradient is less than about 6 bar, such as less than about 5 bar, such as less than about 3 bar.

Given sufficient filtration of the permeate, in some embodiments only the retentate requires further sanitation. For example, the permeate of at least one filtration stage may be free of up to about 100% of the pesticides in the influent wastewater. In some embodiments, the permeate of at least one filtration stage is free of greater than about 95% of the pesticides in the influent wastewater, such as greater than about 96%, such as greater than about 97%, such as greater than about 98%, such as greater than about 99%, such as greater than about 99.9%. In some examples, one filtration stage removes a first portion of the pesticides and a second filtration stage removes a second portion. For example, in some embodiments, about 70% to about 90% of the pesticides in the original wastewater may be removed in a first stage and a total of at least about 95% of the pesticides in the original wastewater may be removed in a second stage.

In other embodiments, both the retentate and the permeate undergo additional sanitation steps, e.g. electrolysis or other sanitation methods, such as additional filtration stages. The retentate and the permeate may undergo the same or different additional steps.

In cross flow operation, a filter may optionally pass at least some portion of the retentate into a recirculation loop which recycles the retentate back into the same first filtration device, optionally by way of one or more other devices. The recycling may occur in batches: for example, the retentate may be recycled through the first crossflow filter until the retentate reaches a certain concentration of contaminants, and, in some embodiments, the recirculated retentate is passed through additional filtration devices (e.g. a dead-end filtration device) en route to the inlet of the first crossflow filtration device. Alternatively, a pump may continuously draw some portion of the retentate stream back through the filtration device to increase the average retentate concentration level downstream of the recirculation loop.

In general, the wastewater is passed into an electrolytic cell. The electrolytic or electrolysis cell may contain at least one anode and at least one cathode. In one example, the anodes and cathodes in the electrolytic cell may be of the same material, or they may be of independently chosen materials. In another example, the electrodes may be of the same material initially, but use as an anode or a cathode may alter the composition such that the anodes and the cathodes are distinct. In one such embodiment, the anodes and cathodes may include an oxide or suboxide of $TiO_x$, such as a Magneli phase material of the formula $(Ti_nO_{2n-1})$, where n=4-10, $Ti_4O_7$ or $Ti_5O_9$ being the most electrically conductive examples, formed by heating $TiO_2$ in the presence of $H_2$. In some examples, the surface of such an electrode will oxidize to a composition of $TiO_x$, x>1.75, after use as an anode and $TiO_x$, x<1.75, after use as a cathode. In general, similar electrodes are found on the marketplace under the Ebonex branding. Magneli phase electrodes are known to have a high overpotential for oxygen evolution (i.e. splitting water). A high overpotential for $O_2$ evolution is a characteristic favorable for the present application because less energy will be wasted in splitting water and more energy may be directed toward oxidizing the contaminants.

In some embodiments, the cell does not have a membrane, and all reaction products remain in the treated flow. Advantageously, an electrolytic cell operating without a membrane facilitates pH stability throughout the oxidation process. For example, the pH may be greater than about 4, such as greater than about 5, such as greater than about 6, such as greater than about 7. Generally, the pH is lower than about 10, such as lower than about 9, such as lower than about 8.

In some embodiments, the temperature of the wastewater in the electrolytic cell may be inherited from the source wastewater. In other embodiments, the temperature may be monitored and/or controlled. For example, the temperature may be less than about 50° C., such as less than about 40° C., such as less than about 30° C., such as less than about 20° C. Generally, however, the temperature is greater than about 2° C., such as greater than about 5° C., such as greater than about 10° C.

In some embodiments, the conductivity of the influent wastewater may be monitored and/or controlled for the electrolysis reaction. For example, the conductivity may be greater than about 0.1 mS/cm, such as greater than about 0.75 mS/cm, such as greater than about 1.5 mS/cm, such as greater than about 3 mS/cm, Generally, however, the conductivity is less than about 50 mS/cm, such as less than about 30 mS/cm, such as less than about 10 mS/cm, such as less than about 5 mS/cm, such as less than about 3 mS/cm.

The electrolysis reaction may be direct or mediated. Direct electrolysis is carried out on the surface of the electrodes, requiring that the target of oxidation be oxidized once adsorbed into the electrode surface. Mediated electrolysis relies a mediator which oxidizes on the surface of the anode and subsequently travels into the bulk fluid to react with the target of oxidation. One such mediator is the highly reactive hydroxyl radical (.OH). Hydroxyl radicals have a high oxidation reduction potential.

Another mediator may include any salts present in the influent wastewater stream. For example, chloride ions may be present in an amount greater than about 10 mg/L, such as greater than about 20 mg/L, such as greater than about 75 mg/L, such as greater than 150 mg/L, such as greater than 200 mg/L, such as greater than about 250 mg/L, such as greater than about 600 mg/L, such as greater than about 1000 mg/L. Generally, however, the chloride ions are present in an amount less than about 3000 mg/L, such as less than about 2000 mg/L, such as less than about 1000 mg/L, such as less than about 500 mg/L.

In some embodiments, another oxidant may be added to the process, e.g. passed into the electrolytic cell along with the wastewater, or added downstream of the electrolytic cell. For example, a peroxide such as hydrogen peroxide is an oxidant that can enhance and facilitate the oxidation process. In particular, hydrogen peroxide advantageously produces the hydroxyl radical at the cathode, enhancing mediated oxidation. Hydrogen peroxide may be provided as a dosage, such as in amounts proportional to the weight of the wastewater passing through the electrolytic cell. For example, the hydrogen peroxide may be added in an amount greater than about 0.01% by weight of the wastewater, such as greater than about 0.1%, such as greater than about 0.5%, such as greater than about 1%, such as greater than about 5%. In some embodiments, the peroxide is added in amounts lower than about 5% by weight of the wastewater, such as lower than about 1%, such as lower than about 0.5%, such as lower than about 0.1%, such as lower than about 0.01%, The peroxide dosage source may be a vessel containing a hydrogen peroxide solution, optionally a concentrated solution (e.g. greater than about 10%, 20%, 30%, 40% or 50% concentration by weight of solution). Alternatively, the hydrogen peroxide may be generated in whole or in part by an electrolysis cell, optionally even within an electrolysis cell as described above.

In one embodiment, the mediator may comprise chloride ions. If desired, the amount of chloride ions in the water may be adjusted to meet a particular target amount. For example, a chloride solution (e.g. a brine of sodium chloride) may be injected into the wastewater, providing doses of chloride ions in the absence of or in supplement to any available chloride in the influent wastewater. The dosage amount may vary, providing up to 100 wt. % chloride by weight of the total amount of chloride ions or as little as 0 wt. %, such as from about 10 wt. % to 90 wt, %, such as from 40 wt. % to 60 wt. %.

In some embodiments, the wastewater stream may be injected with a brine of salt in various concentrations. For example, the brine may contain greater than about 5 wt. % salt by weight of water, such as greater than about 10 wt. %, such as greater than about 20 wt. %. Generally, however, the salt will be present in the brine in an amount less than about 28 wt. %, such as less than about 26 wt. %. The salt concentration of the brine may be adjusted to achieve various target salt concentrations in the wastewater stream; for example, at 15 wt. % salt, about 6.7 L of brine will raise the salt concentration of the wastewater by 1000 mg/L. A 25 wt. % brine will achieve the same effect with only 4 L of brine.

In some embodiments, the injection of a brine solution into the wastewater may operate according to a control system. For example, an open-loop control system may inject a prescribed volume of brine per unit volume of influent wastewater. Alternatively, a closed-loop system might actively test the salinity of the influent wastewater and dose the wastewater according to a predetermined algorithm. In another example, the dosage controller may consider other process parameters, such as the quantity of oxidizing agent being synthesized. Various sensors may be used in the construction of a control system; for example, some suitable sensors include flow rate and electrical conductivity sensors.

Mediated electrolysis and direct electrolysis may operate concurrently. Similarly, various mediators may operate simultaneously. For example, chloride ions may directly oxidize on the surface of an anode. In another portion of the anode, hydroxyl radicals may oxidize and travel to the bulk flow to oxidize pollutants alongside the oxidized chloride ions in the bulk flow. Furthermore, whether on the surface of an anode or in the bulk flow, chloride ions may oxidize into hypochlorite, another oxidant which may further oxidize other matter in the wastewater. In this manner, both hydroxyl radicals and chloride ions may concurrently act as mediators.

Because hydroxyl radicals have a short lifespan, it is of a particular advantage that the pollutants pass over and near to the electrode surfaces to be oxidized directly by the electrodes and indirectly by the nearby hydroxyl radicals. In such embodiments, the sanitation of the wastewater is effected synergistically by the direct and mediated oxidation via the electrode surfaces and the hydroxyl radicals.

In an example oxidation process, phenols, a common component in pesticides, may be broken down in a variety of steps, or pathways. For example, phenols may be polymerized and adsorbed via direct oxidation, with the resultant polymers and phenoxy radicals being further mineralized into $CO_2$ via mediated oxidation. When the electrodes are driven at a potential resulting in low hydroxyl formation, this first pathway dominates.

A second pathway takes the phenoxy radicals from the first pathway and reduces them to phenoxonium, which is soon reacted with water to form p-benzoquinone (p-BQ); which is subsequently indirectly oxidized to C4 compounds such as fumaric or maleic acids, which are then indirectly oxidized to C2 compounds such as oxalic or glyoxylic acids, which are then finally directly or indirectly oxidized to $CO_2$.

A third example pathway indirectly oxidizes the phenols immediately into the C4 compounds, which then follow the same breakdown as above into C2 compounds and the subsequent mineralization into $CO_2$.

The mass transport of contaminants from the bulk flow to the surface of the electrodes is maximized in some embodiments such that, for example; all three of the above-described pathways may be executed concurrently. It is believed that when mass transport is limited, contaminants remain in the bulk flow and are only oxidized by those hydroxyl radicals which diffuse through the electrode boundary layer and reach the bulk flow.

Increasing the mass transport of the contaminants to the surface of the electrodes may also reduce unwanted byproducts of the electrolysis process. In one particular example, chlorate ($ClO_3-$) in the boundary layer is oxidized into perchlorate ($ClO_4-$) in large amounts due to available hydroxyl radicals that do not escape the boundary layer and are not spent by oxidizing pollutants. As perchlorate is an undesired byproduct, it is advantageous to increase the mass transport of contaminants to the surface of the electrodes such that the chemical kinetics are the rate-limiting factor. When chemical kinetics are the limiting factor, contaminants may build up on the surface of the electrodes and may be oxidized by both direct and mediated pathways, increasing overall efficacy of the electrolysis system as well as inhibiting perchlorates.

Mass transport may be increased, for example, by manipulating the velocity and turbulence of the flow through the electrolytic cell. These manipulations may be applied to traditional electrolytic cell designs, such as in a parallel plate electrolytic cell. In a particular method, however, porous electrodes are employed such that at least a portion of the flow passes through the electrode material. In addition to shrinking boundary layers, the use of a porous electrode arrangement increases the specific surface area of the electrodes. Of particular advantage, Magneli phase material may be naturally porous in some cases.

Some embodiments may feature the retentate stream of one or more filtration stages passing through at least one electrolytic cell. In other embodiments, the flow may pass through a plurality of electrolytic cells in parallel. Other embodiments may direct only a portion of the retentate stream to an electrolytic cell, the treated portion being returned to the mainstream retentate to effect sanitation. Of particular advantage, parallel cell configurations may permit one or more cells to remain in operation while flow is redirected from one or more other cells while being serviced. Maintenance, for example, may include an acid wash to remove buildup on the cell electrodes.

The structure of the electrolytic cell may follow any design known in the art. For example, the cell may be of a unipolar configuration or a bipolar configuration. Advantageously, bipolar configurations may permit large electrode surface areas to facilitate many simultaneous oxidation reactions. Additionally, bipolar configurations may offer increased power efficiency.

The current and voltage requirements will vary based on the cell size and design and may suitably be configured by one skilled in the art. For example, in some embodiments, the voltage supplied across the electrodes may be less than about 50 UDC, such as less than about 40 VDC, such as less than about 30 VDC. Generally, however, the voltage may be greater than about 10 VDC, such as greater than about 15 VDC, such as greater than about 20 VDC. In some embodiments, the current drawn by one cell may be less than about 500 A, such as less than about 250 A, such as less than about 150 A. Generally, however, the current will be greater than about 1 A, such as greater than about 10 A, such as greater than about 50 A, such as greater than about 100 A.

In one embodiment, the electrolytic cell is powered by a controllable power supply. For example, a flow meter upstream of the electrolytic cell may provide a signal to a controller corresponding to the volumetric flow rate and/or the mass flow rate. The controller may process the signal according to pre-programmed algorithms and send an appropriate power signal to the electrolytic cell. In such a manner, the electrolysis reaction may adapt to flow fluctuations in the influent wastewater and maintain peak performance. The power supply controller may also optionally consider other process parameters, such as a measured quantity of oxidizing agent downstream of the electrolytic cell, a measured contaminant concentration downstream of the cell, and/or an electrical conductivity measurement, and adjust the power signal accordingly. In another embodiment, the flow rate through the system may be controlled by a controllable valve responsive to the same or different measured parameters.

In one embodiment, the electrolysis reaction may operate in a recirculation loop. As an alternative to increasing the size, quantity, and/or power of the electrolytic cell(s), the wastewater pollutants may be more fully oxidized if passed through one or more cells repeatedly. For example, the electrolytic cell effluent may be recycled through the electrolytic cell in part or in whole. In one embodiment, the electrolytic cell effluent is deposited in a holding tank, such as an open or closed vessel or even a length of pipe. A recirculation pump recycles the water in the holding tank back through the electrolysis reaction until the pesticide concentration levels reach a predetermined threshold. In some embodiments, a peroxide is added to the holding tank to enhance the oxidation of the recirculated effluent.

The quality of the electrolytic cell effluent may optionally be monitored and/or controlled using various techniques. For example, the effluent may be tested for hydroxyl radical content, oxidation-reduction potential, pH, pesticide content, or other such parameters. Based on the output of such measurements, the effluent may by either recycled through the electrolysis reaction or may be directed back to the influent wastewater stream for filtration in the primary filtration stage. For example, the effluent contaminant concentration may be reduced to that of the influent wastewater. In this manner, the total wastewater contamination is reduced by creating a concentration of the contaminants and attacked the concentrated wastewater directly without extra water (i.e. the permeate) present to dilute the oxidation process.

In general, the electrolytic cell may reduce or oxidize up to about 100% of the pesticides passed into the cell. In some embodiments, greater than about 70% of the pesticides are oxidized, such as greater than about 80%, such as greater than about 90%, such as greater than about 95%, such as greater than about 98%.

The gas byproducts of the electrolysis reaction (e.g. hydrogen or carbon dioxide) may be vented and/or captured at any suitable point in the system. For example, the gas may be collected or released when the treated water exits the process stream into a tank or basin.

FIG. 1 depicts an example embodiment. Wastewater from a holding tank is directed to a wastewater inlet 101 and passes through a preliminary filtration stage 102, Particulates removed by the preliminary filtration stage 102 are drained through a drain 103 which returns to the holding tank. Particulates built up in the holding tank may be removed for direct disposal if necessary. For example, built up particulates may be dredged and burned, in some cases.

A pump 104 provides influent wastewater to a primary filtration stage 105 forming a permeate stream 111 and a retentate stream 106. The retentate stream 106 optionally passes through a recirculation loop 107. After repeated filtration, the retentate 106 passes into an electrolytic cell 108. The effluent of the electrolytic cell 108 is deposited in a holding tank 109 which may optionally also have a recirculation loop 107. The holding tank may also optionally have a peroxide inlet 110. After sufficient oxidation, the treated water travels to outlet 117.

The permeate stream 111 travels to a polishing filtration stage 112, which may be, for example, an activated carbon filter. In some examples, a drain 113 removes the retentate of the polishing step, optionally to or in a replaceable cartridge. The effluent of both the polishing filtration stage 112 and the holding tank 109 may be substantially free of pesticides, combining to enter a final polishing filter 114. The final polishing filter may be a very fine filtration stage, such as to remove sodium in the permeate stream 116. In such an example, a treated sodium-rich retentate stream 115 may be disposed of (e.g. into a sewer system) and the sodium-free permeate stream 116 may be recycled into the original process that produced the wastewater (e.g. an irrigation system for a bulb factory).

As demonstrated above, the product stream may be any one of 117, 115, or 116, depending on the desired product.

Figure 2:
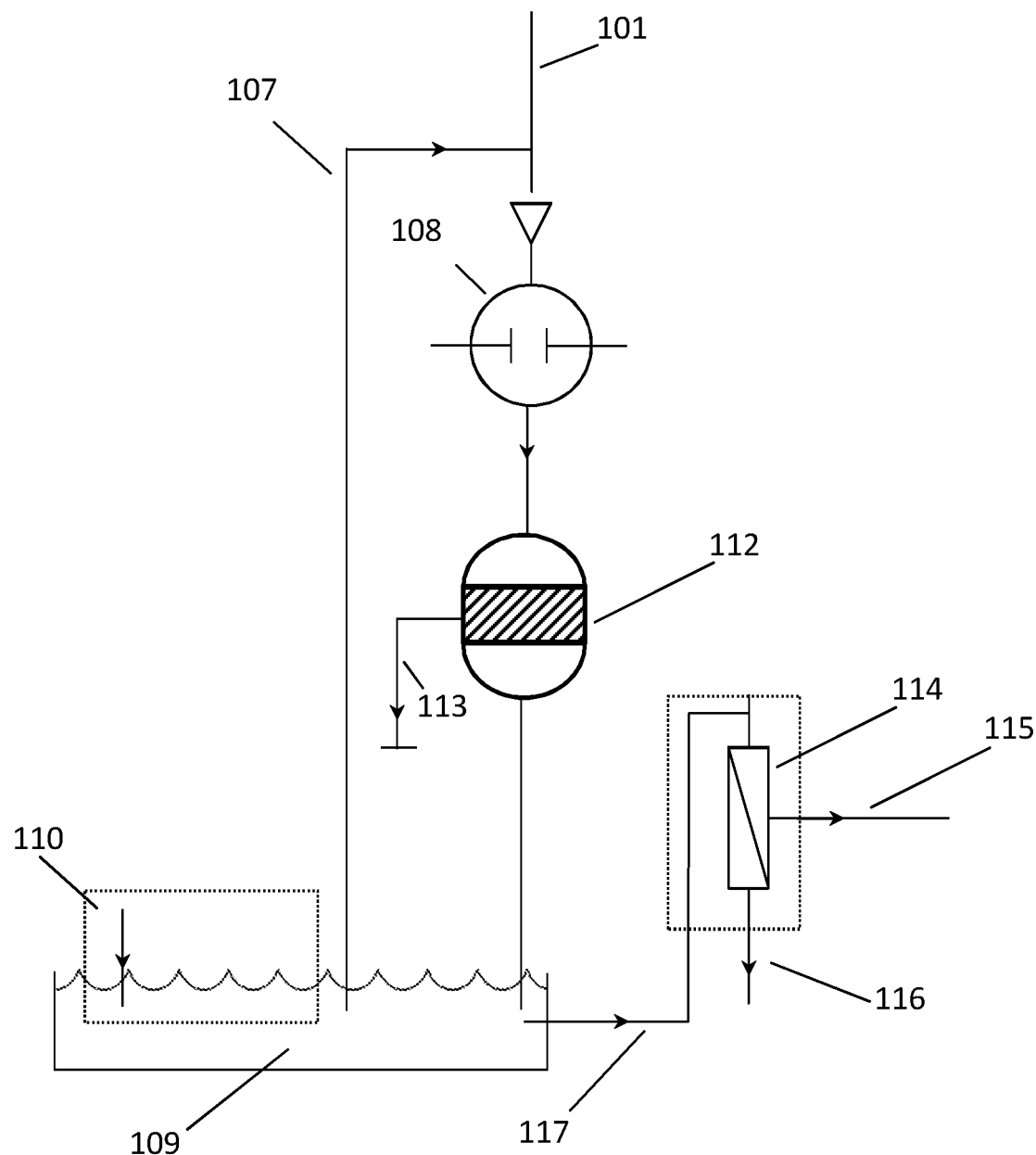
FIG. 2 illustrates another embodiment of a process in accordance with the present disclosure.

Another embodiment of a process in accordance with the present disclosure is shown in FIG. 2. Like reference numerals have been used to indicate similar elements. In FIG. 2, wastewater entering the wastewater inlet 101 is fed directly into the electrolytic cell 108. From the electrolytic cell 108, the wastewater is then fed to a filtration stage 112, which may contain an activated carbon filter. The activated carbon filter can be used to remove residual pesticides. In one embodiment, a drain 113 removes the retentate of the filtration step.

From the filtration stage 112, the wastewater is fed to a holding tank 109 as described above and optionally treated with peroxide. The treated water can then travel to outlet 117 and fed to a final polishing filter 114 if desired. In other embodiments, however, the polishing filter 114 may not be necessary.

The steps as disclosed herein may effectively reduce the pesticide concentration present in a wastewater stream. In some embodiments, even up to about 100% of pesticides may be removed. For example, greater than about 70% of pesticides may be removed, such as greater than 85%, such as greater than 95%. In one embodiment, the process of the present disclosure is capable of removing more than 99.8% of the pesticide imidacloprid that may be contained in the original wastewater stream.

In one embodiment, the process can also be used to effectively reduce COD, BOD and/or ammonia levels in the wastewater. For example, the chloride ions available in the wastewater, whether preexisting in the influent stream or from a dosage, may be converted to an oxidizing agent by passing the wastewater into an electrolysis cell. The resultant oxidizing agent may be a chlorine compound, e.g. hypochlorous acid. In particular, hypochlorous acid is known for its disinfectant qualities. For example, in some embodiments, 3 chloride ions in the wastewater stream can produce 1 $Cl_2$, which will be converted to hypochlorous acid.

In one embodiment, the amount of free chlorine may be controlled so as to reduce COD. BOD, and/or ammonia levels. The free ammonia concentration, for instance, can generally be greater than about 0.01 mg/L, such as greater than about 0.5 mg/l, such as greater than about 1 mg/l, such as greater than about 3 mg/l, and generally less than about 5 mg/L, such as less than about 3.5 mg/L.

In this manner, COD. BOD, and ammonia present in the wastewater stream can be reduced by greater than about 70%, such as greater than about 85%, such as greater than about 95%. In one embodiment, for instance, 100% of the above contaminants can be removed. The COD may be lowered to less than about 700 mg/L, such as less than about 500 mg/L, such as less than about 200 mg/L, such as less than about 50 mg/L, such as less than about 20 mg/L, such as less than about 5 mg/L, such as less than about 1 mg/L. Generally, however, the COD may remain greater than about 0.05 mg/L, such as greater than about 0.5 mg/L such as greater than about 1 mg/L. As noted previously, the BOD is always less than or equal to COD. Ammonia concentration may be reduced to less than about 35 mg/L, such as less than 10 mg/L, such as less than about 2 mg/L, such as less than about 0.5 mg/L, such as less than about 0.1 mg/L. Generally, however, ammonia may remain greater than 0.025 mg/L.

The water treatment process as presently disclosed may be executed by permanent or temporary equipment. For example, in the event of a natural disaster, when established treatment plants are taken offline, mobile machinery equipped as described herein may be set up to temporarily provide clean water to affected communities. Alternatively, machinery equipped as described herein may be installed in replacement of aging or otherwise ineffective treatment methods. In another implementation, said machinery may operate in supplement to existing wastewater processing methods; for example, a greenhouse, farm, garden, flower bulb treatment facility, or other such agricultural installment may augment existing water filtration methods with equipment following the present disclosure to minimize the amount of any pesticides, herbicides, or other chemicals passed to the sewer lines. A similar supplementary installation may be used by a pharmaceutical industry to remove similar medicine residuals.

In some embodiments, the equipment may be scaled to compact sizes suitable for transport, Compact packaging would facilitate transport across various terrain via any type of vehicle.

In one embodiment, a system prepared as described herein might be included in a self-contained water purification unit, capable of drawing water from a contaminated source (e.g. a river or well) and filling a clean water reservoir (e.g. large drum or tank). Optionally, such a unit could be installed on a truck or tractor chassis to provide easy transport and an integrated power source (e.g. the engine of the vehicle or a secondary generator).

The process and systems as disclosed herein may be scaled to suit any variety of wastewater treatment needs. For example, the process may be applied to a small wastewater stream, a wastewater stream of a large facility, or to the wastewater stream of a connected system of facilities. In general, the wastewater flow rate may be greater than about 0.001 $m^3$/hr, such as greater than about 0.01 $m^3$/hr, such as greater than about 0.1 $m^3$/hr, such as greater than about 1 $m^3$/hr, such as greater than about 10 $m^3$/hr, such as greater than about 50 $m^3$/hr, such as greater than about 100 $m^3$/hr, such as greater than about 1000 $m^3$/hr, such as even greater than 10000 $m^3$/hr. In some embodiments, the flow rate is less than about 10000 $m^3$/hr, such as less than about 1000 $m^3$/hr, such as less than about 50 $m^3$/hr, such as less than about 10 $m^3$/hr, such as less than about 1 $m^3$/hr. It is to be understood that the various values of parameters disclosed herein are given to provide example embodiments and that scaling the parameters to suit different embodiments remains within the scope of the disclosure.

The effectiveness of processes prepared according to the present disclosure will be demonstrated in the following example.

EXAMPLE

Recycled water from a greenhouse was collected in a large storage tank. The water contained built up pesticides, as well as dirt and humidic acid (i.e. humic acid). The influent was fed at 2.03 L/hour. A preliminary filtration stage 102 used a 100 micron glass filter. A primary filtration stage 105 used a DNF40 WMC200 nanofilter in crossflow at 240 L/hour with a 4 bar feed pressure (3.8 bar exit pressure). An electrolytic cell with Magneli phase titanium oxides was used. Removal rate of pesticides was greater than 95%.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the invention so further described in such appended claims.

What is claimed:

1. A process for treating wastewater comprising:
   feeding a wastewater stream (B) to a preliminary filtration stage;
   feeding the permeate of the preliminary filtration stage to a primary filtration stage, wherein the preliminary filtration stage has greater porosity than the primary filtration stage, wherein the retentate of the primary filtration stage comprises a wastewater stream (A);
   feeding the wastewater stream (A) to an electrolysis cell;
   oxidizing the wastewater stream (A)
   recirculating the effluent of the electrolysis cell through the electrolysis cell; and
   passing the treated effluent of the electrolysis cell and the permeate of the filtration stage into a product stream;
   wherein the wastewater stream (A) originally comprises a contaminant, the contaminant being a humic acid, a hormone, and/or a pesticide, and wherein the product stream is free of more than about 95% of the contaminant.

2. A process as defined in claim 1, wherein the primary filtration stage is a nanofiltration stage.

3. A process as defined in claim 1 comprising the step of feeding the permeate of the primary filtration stage to a polishing filtration stage.

4. A process as defined in claim 3, wherein the polishing filtration stage comprises producing a permeate of at least one polishing filtration stage that has a lower sodium concentration than the retentate of the at least one polishing filtration stage.

5. A process as defined in claim 1, wherein at least one filtration stage comprises producing a permeate of the at least one filtration stage that is free of at least about 85% of the original pesticide content of the influent wastewater.

6. A process as defined in claim 1, wherein the permeate of at least one filtration stage is free of at least 95% of the original pesticide content of the influent wastewater.

7. A process as defined in claim 1, wherein the electrolysis cell electrodes comprise an oxide or suboxide of $TiO_x$.

8. A process as defined in claim 7, wherein the oxide or suboxide of $TiO_x$ is a Magneli phase material of the formula ($Ti_nO_{2n-1}$), where n is 4, 5, 6, 7, 8, 9, or 10.

9. A process as defined in claim 8, wherein the suboxide of $TiO_x$ is a Magneli phase material of the formula $Ti_4O_7$.

10. A process as defined in claim 1, wherein flow of the permeate of the primary filtration stage is greater than about 0.001 m³/hr.

11. A process as defined in claim 1, wherein flow of the permeate of the primary filtration stage is greater than about 1 m³/hr.

12. A process as defined in claim 1, wherein the wastewater stream being fed to the electrolysis cell has a chloride ion concentration, and wherein the chloride ion concentration of the wastewater stream being fed to the electrolysis cell is greater than about 10 mg/L.

13. A process as defined in claim 10, further comprising the step of monitoring a parameter of the flow through the electrolysis cell, the electrolysis cell being in communication with a power supply, and wherein voltage supplied to the electrolysis cell by the power supply is increased or decreased based on the monitored parameter.

14. A process as defined in claim 13, wherein the wastewater stream being fed to the electrolysis cell has a chloride ion concentration, and wherein the process further comprises the step of monitoring the chlorine content, oxidation-reduction potential, pH, and/or pesticide content in the product stream and wherein at least one parameter within the process is changed if a monitored concentration is above a preset limit, the parameter being changed comprising the flow rate of the wastewater stream or the amount of voltage supplied to the electrolysis cell.

15. A process as defined in claim 1, further comprising the step of adding a peroxide to the wastewater stream (A) and/or the effluent of the electrolytic cell recirculated to the electrolytic cell.

16. A system comprising:
   a preliminary filter;
   a primary filter; and
   an electrolysis cell;
   configured to execute the process of claim 1,
   wherein a wastewater stream (B) is fed to the preliminary filter;
   the permeate of the preliminary filter is fed to the primary filter, wherein the preliminary filter has greater porosity than the primary filter, wherein the retentate of the primary filter comprises a wastewater stream (A);
   the wastewater stream (A) is fed to the electrolysis cell;
   the wastewater stream (A) is oxidized;
   the effluent of the electrolysis cell is fed through the electrolysis cell; and
   the treated effluent of the electrolysis cell and the permeate of the filtration stage are passed into a product stream.

* * * * *